US011866006B2

(12) United States Patent
Hasegawa et al.

(10) Patent No.: US 11,866,006 B2
(45) Date of Patent: Jan. 9, 2024

(54) AUTHENTICATION SYSTEM, CONTROL DEVICE, AND NON-TRANSITORY COMPUTER-READABLE MEDIUM

(71) Applicant: KABUSHIKI KAISHA TOKAI RIKA DENKI SEISAKUSHO, Aichi (JP)

(72) Inventors: Yosuke Hasegawa, Aichi (JP); Daisuke Ogawa, Aichi (JP); Ryoya Kato, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/896,480

(22) Filed: Aug. 26, 2022

(65) Prior Publication Data
US 2023/0068688 A1 Mar. 2, 2023

(30) Foreign Application Priority Data

Sep. 1, 2021 (JP) .................................. 2021-142408

(51) Int. Cl.
*B60R 25/24* (2013.01)
*G07C 9/28* (2020.01)
(52) U.S. Cl.
CPC .............. *B60R 25/245* (2013.01); *G07C 9/28* (2020.01)
(58) Field of Classification Search
None
See application file for complete search history.

(56) References Cited

U.S. PATENT DOCUMENTS 11,164,413 B2 * 11/2021 Kuenzi .............. G07C 9/00904

FOREIGN PATENT DOCUMENTS

JP 2016-211334 A 12/2016

* cited by examiner

*Primary Examiner* — Carlos Garcia
(74) *Attorney, Agent, or Firm* — GREENBLUM & BERNSTEIN, P.L.C.

(57) ABSTRACT

A first communication device forms a first wireless communication area at least outside a prescribed area. A second communication device forms a second wireless communication area at least inside the prescribed area. A control device performs an operation control of a first device to be controlled, based on first authentication processing for authenticating a first mobile device located in the first wireless communication area. The control device performs an operation control of a second device to be controlled that is different from the first device to be controlled, based on second authentication processing for authenticating the first mobile device located in the second wireless communication area. The control device performs an operation control of the first communication device to perform communication with a second mobile device that is different from the first mobile device after the operation control of the first device to be controlled is performed.

6 Claims, 6 Drawing Sheets

AUTHENTICATION SYSTEM, CONTROL DEVICE, AND NON-TRANSITORY COMPUTER-READABLE MEDIUM

CROSS-REFERENCE TO RELATED APPLICATION

The present application is based on Japanese Patent Application No. 2021-142408 filed on Sep. 1, 2021, the entire contents of which are incorporated herein by reference.

BACKGROUND

The presently disclosed subject matter relates to an authentication system using a mobile device adapted to be carried by a user. The presently disclosed subject matter also relates to a control device adapted to be a part of the authentication system, as well as a non-transitory computer-readable medium having stored a computer program adapted to be executed by a processor of the control device.

Japanese Patent Publication No. 2016-211334A discloses an authentication system adapted to be installed in a vehicle that is an example of a mobile entity. In the system, authentication is performed between a control device for controlling the operation of a locking/unlocking device of a vehicle door and a mobile device carried by a user through communication with radio waves. When the authentication is approved in a state where the user touches a touch sensor provided in a door handle, the control of the operation of the locking/unlocking device by the control device is allowed.

SUMMARY

It is demanded to improve the convenience of an authentication system adapted to be shared by a plurality of mobile devices.

An illustrative aspect of the presently disclosed subject matter provides an authentication system, comprising:
 a first communication device configured to form a first wireless communication area at least outside a prescribed area;
 a second communication device configured to form a second wireless communication area at least inside the prescribed area; and
 a control device configured to:
  perform an operation control of a first device to be controlled, based on first authentication processing for authenticating a first mobile device located in the first wireless communication area;
  perform an operation control of a second device to be controlled that is different from the first device to be controlled, based on second authentication processing for authenticating the first mobile device located in the second wireless communication area; and
  perform an operation control of the first communication device to perform communication with a second mobile device that is different from the first mobile device after the operation control of the first device to be controlled is performed.

An illustrative aspect of the presently disclosed subject matter provides a control device, comprising:
 an interface configured to:
  accept authentication information, by way of a first communication device that forms a first wireless communication area at least outside a prescribed area, from a first mobile device that is located in the first wireless communication area; and
  accept the authentication information, by way of a second communication device that forms a second wireless communication area at least inside the prescribed area, from the first mobile device that is located in the second wireless communication area; and
 a processor configured to:
  perform an operation control of a first device to be controlled, based on first authentication processing for authenticating the first mobile device with the authentication information accepted by way of the first communication device;
  perform an operation control of a second device to be controlled that is different from the first device to be controlled, based on second authentication processing for authenticating the first mobile device with the authentication information accepted by way of the second communication device; and
  perform an operation control of the first communication device to perform communication with a second mobile device that is different from the first mobile device after the operation control of the first device to be controlled is performed.

An illustrative aspect of the presently disclosed subject matter provides a non-transitory computer-readable medium having stored a computer program adapted to be executed by a processor installed in a control device, the computer program being configured to cause, when executed, the control device to:
 accept authentication information, by way of a first communication device that forms a first wireless communication area at least outside a prescribed area, from a first mobile device that is located in the first wireless communication area;
 perform an operation control of a first device to be controlled, based on first authentication processing for authenticating the first mobile device with the authentication information accepted by way of the first communication device;
 accept the authentication information, by way of a second communication device that forms a second wireless communication area at least inside the prescribed area, from the first mobile device that is located in the second wireless communication area;
 perform an operation control of a second device to be controlled that is different from the first device to be controlled, based on second authentication processing for authenticating the first mobile device with the authentication information accepted by way of the second communication device; and
 perform an operation control of the first communication device to perform communication with a second mobile device that is different from the first mobile device after the operation control of the first device to be controlled is performed.

According to the configuration of each of the illustrative aspects described above, even after the operation control of the first device to be controlled is performed based on the authentication of the first mobile device and while the operation control of the second device to be controlled is performed based on the authentication of the first mobile device, the establishment of communication with the second mobile device is allowed, so that the use of the first device to be controlled by the second mobile device is not restricted. Accordingly, it is possible to improve the convenience of an authentication system shared by a plurality of mobile devices.

DESCRIPTION OF EMBODIMENTS

Exemplary embodiments will be described in detail below with reference to the accompanying drawings. In each of the drawings, the scale is appropriately changed in order to make each element illustrated have a recognizable size.

Figure 1:
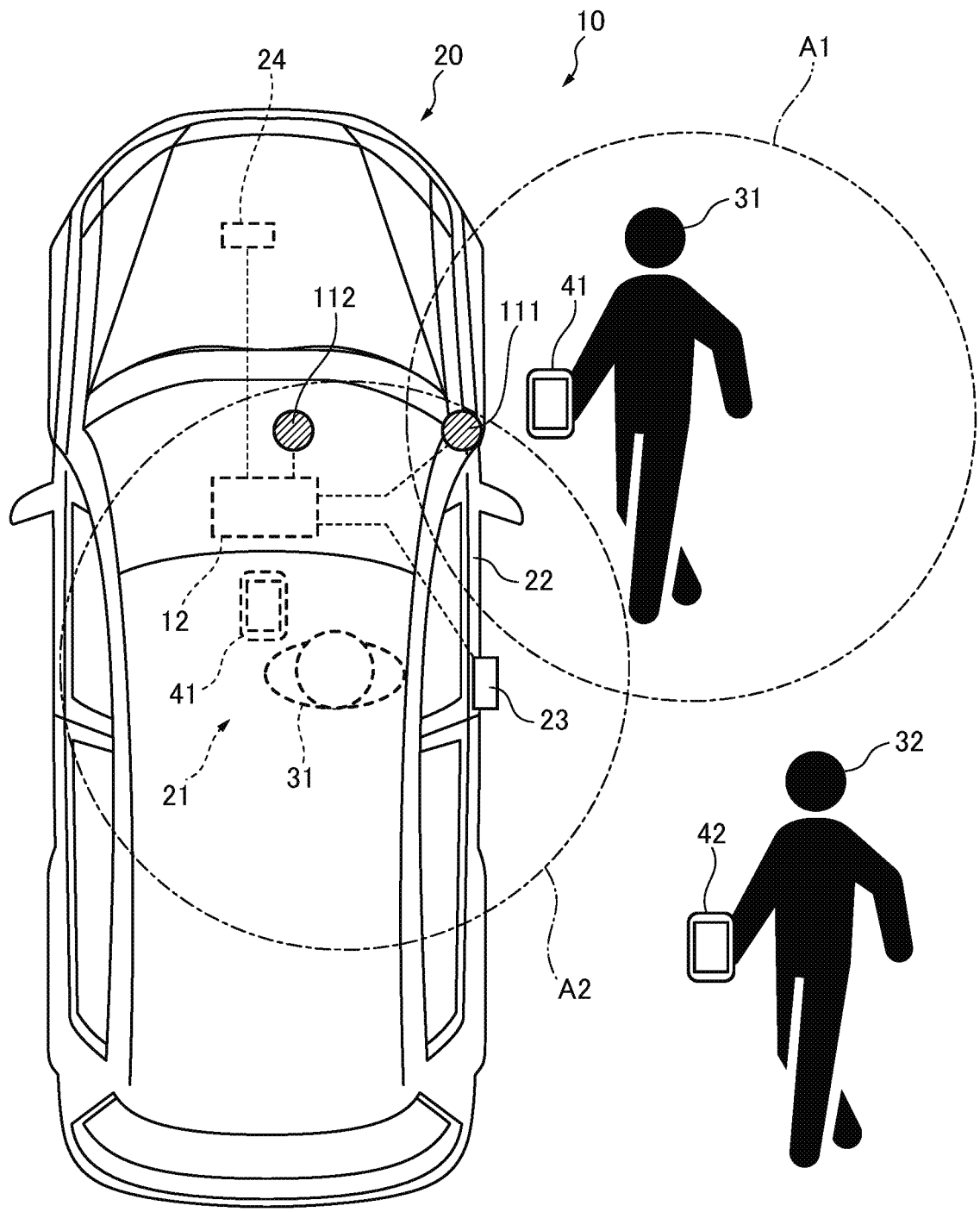
FIG. 1 illustrates a configuration of an authentication system according to an embodiment.

FIG. 1 illustrates a configuration of an authentication system 10 according to a first embodiment. The authentication system 10 may be used to authenticate a mobile device adapted to be carried by a user in order to authorize the use of the vehicle 20 by a user carrying the mobile device. The shape of the vehicle 20 is merely illustrative. The vehicle 20 is an example of a mobile entity.

The authentication system 10 includes a first communication device 111. The first communication device 111 includes an antenna capable of forming a first wireless communication area A1 at least outside a cabin 21 of the vehicle 20. The first wireless communication area A1 is an area capable of performing short-range wireless communication with a mobile device. The cabin 21 is an example of a prescribed area.

As used herein, the term "short-range wireless communication" means non-contact communication performed using radio waves while complying with IEEE 802.15 or IEEE 802.11 standards. Examples of the technology capable of executing the short-range wireless communication include Bluetooth (registered trademark), Bluetooth Low Energy (registered trademark), Ultra Wide Band (UWB), ZigBee (registered trademark), and Wi-Fi (registered trademark). As used herein, the "short-range wireless communication" is distinguished from "proximity wireless communication" that is non-contact communication for transmitting information through electromagnetic induction coupling. Examples of the technology capable of executing the proximity wireless communication include NFC (Near Field Communication), RF-ID, and the like.

As used herein, the expression "transmitting a signal with radio waves" means wirelessly transmitting a signal with radio waves at a frequency or a frequency band defined in the short-range wireless communication standard described above.

Specifically, in the first communication device 11, the characteristics and arrangement of the antenna are determined so as to transmit a first trigger signal TR1 (described later with reference to FIG. 2) with radio waves to at least the outside of the cabin 21. In this example, the first communication device 111 is disposed in a door pillar of the vehicle 20. The first communication device 111 may be disposed on a door 22, a door handle, a door mirror, or the like of the vehicle 20. The door 22 is an example of a reclosable body.

The authentication system 10 includes a second communication device 112. The second communication device 112 includes an antenna capable of forming a second wireless communication area A2 at least inside the cabin 21. The second wireless communication area A2 is an area capable of performing the short-range wireless communication with a mobile device.

Specifically, in the second communication device 12, the characteristics and arrangement of the antenna are determined so as to transmit a second trigger signal TR2 (described later with reference to FIG. 2) with radio waves to at least the inside of the cabin 21. In this example, the second communication device 112 is disposed at an appropriate position in the cabin 21.

The authentication system 10 includes a control device 12. In this example, the control device 12 is installed in the vehicle 20.

The control device 12 is configured to control an operation of a locking/unlocking device 23 installed in the vehicle 20 based on a first authentication processing for authenticating a mobile device located in the first wireless communication area A1. The locking/unlocking device 23 is a device for locking/unlocking the door 22 for opening/closing the cabin 21. The locking/unlocking device 23 is an example of a first device to be controlled.

The control device 12 is configured to control an operation of an ignition power source 24 installed in the vehicle 20 based on a second authentication processing for authenticating a mobile device located in the second wireless communication area A2. The ignition power source 24 is a device for supplying power for activating an engine of the vehicle 20. The engine may include at least one of an internal combustion engine and an electric motor. The ignition power source 24 is an example of a second device to be controlled.

The authentication system 10 is configured to be shared by a first mobile device 41 carried by a first user 31 and a second mobile device 42 carried by a second user 32. That is, each of the first mobile device 41 and the second mobile device 42 includes an antenna capable of performing the short-range wireless communication.

Figure 2:
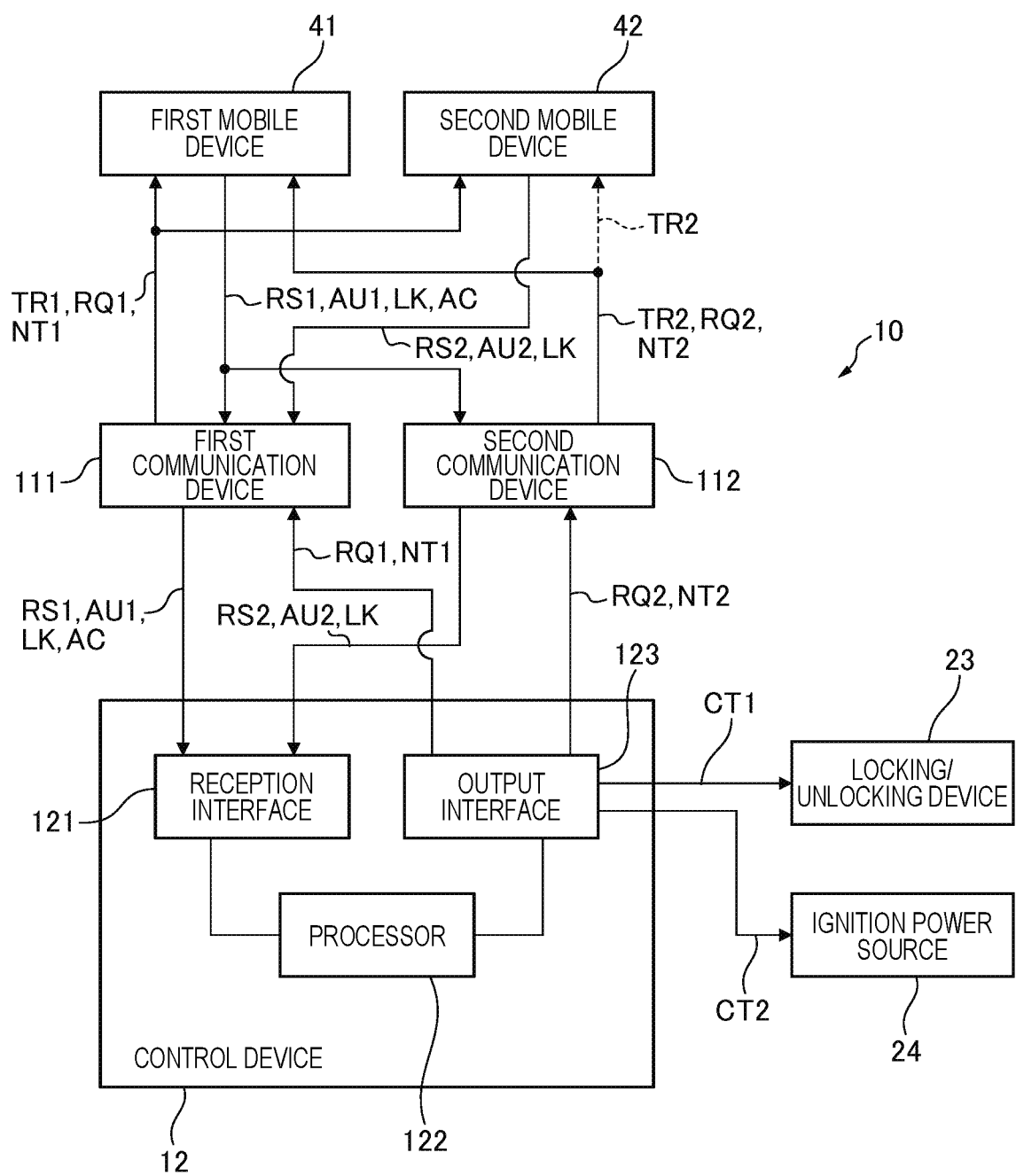
FIG. 2 illustrates a functional configuration of the authentication system of FIG. 1.

As illustrated in FIG. 2, the first mobile device 41 is configured to transmit a first response signal RS1 with radio waves in a case where a received signal strength of the first trigger signal TR1 transmitted from the first communication device 111 exceeds a threshold value. The first response signal RS1 may be an analog signal or a digital signal.

The control device 12 includes a reception interface 121. The reception interface 121 is configured as an interface capable of receiving the first response signal RS1 through the first communication device 111. In a case where the first response signal RS1 is an analog signal, the reception interface 121 includes an appropriate conversion circuit including an A/D converter.

The control device 12 includes a processor 122 and an output interface 123. The processor 122 is configured to, based on the acceptance of the first response signal RS1 by the reception interface 121 in response to the first trigger signal TR1, determine that a communication link is established between the first communication device 111 and the first mobile device 41, and to output a first request signal RQ1 from the output interface 123. The first request signal RQ1 is a signal for requesting a mobile device located in the first wireless communication area A1 to transmit authentication information that is to be used in the first authentication processing. The first request signal RQ1 may be an analog signal or a digital signal.

Accordingly, the output interface 123 is configured as an interface for outputting the first request signal RQ1 to the first communication device 111. In a case where the first request signal RQ1 is an analog signal, the output interface 123 includes an appropriate conversion circuit including a D/A converter.

The first mobile device 41 is configured to transmit first authentication information AU1 with radio waves in response to the first request signal RQ1. The first authentication information AU1 is information capable of identifying at least one of the first user 31 and the first mobile device 41. The first authentication information AU1 may be in the form of analog data or digital data.

Accordingly, the reception interface 121 of the control device 12 is configured as an interface capable of accepting the first authentication information AU1 through the first communication device 111. In a case where the first authentication information AU1 is in the form of analog data, the reception interface 121 includes an appropriate conversion circuit including an A/D converter.

The processor 122 is configured to collate the first authentication information AU1 accepted by the reception interface 121 as a response to the first request signal RQ1 with the authentication information of the first mobile device 41 stored in advance in a storage (not illustrated). The processor 122 is configured to determine that the first authentication processing is approved in a case where a matching degree of both information exceeds a threshold value, and to output a first notification signal NT1 from the output interface 123. The first notification signal NT1 is a signal for notifying the mobile device located in the first wireless communication area A1 that the first authentication processing is approved. The first notification signal NT1 may be an analog signal or a digital signal.

Accordingly, the output interface 123 is configured as an interface for outputting the first notification signal NT1 to the first communication device 111. In a case where the first notification signal NT1 is an analog signal, the output interface 123 includes an appropriate conversion circuit including a D/A converter.

The first mobile device 41 is configured to be brought into a state capable of transmitting a locking/unlocking signal LK for instructing the locking/unlocking device 23 to perform a locking/unlocking operation in response to receiving of the first notification signal NT1. In response to a prescribed operation performed by the first user 31 with respect to the first mobile device 41, the locking/unlocking signal LK is transmitted to the first communication device 111 with radio waves. The locking/unlocking signal LK may be an analog signal or a digital signal.

Accordingly, the reception interface 121 of the control device 12 is configured as an interface capable of accepting also the locking/unlocking signal LK through the first communication device 111. In a case where the locking/unlocking signal LK is an analog signal, the reception interface 121 includes an appropriate conversion circuit including an A/D converter.

The processor 122 is configured to output a first control signal CT1 from the output interface 123 in response to the acceptance of the locking/unlocking signal LK by the reception interface 121. The first control signal CT1 is a signal for causing the locking/unlocking device 23 to perform a locking/unlocking operation. The first control signal CT1 may be an analog signal or a digital signal. In a case where the first control signal CT1 is an analog signal, the output interface 123 includes an appropriate conversion circuit including a D/A converter.

The locking/unlocking device 23 is configured to perform locking or unlocking of the door 22 based on the first control signal CT1.

The first mobile device 41 is configured to transmit the first response signal RS1 with radio waves also in a case where a received signal strength of the second trigger signal TR2 transmitted from the second communication device 112 exceeds a threshold value.

The processor 122 of the control device 12 is configured to, based on the acceptance of the first response signal RS1 by the reception interface 121 in response to the second trigger signal TR2, determine that a communication link is established between the second communication device 112 and the first mobile device 41, and to output a second request signal RQ2 from the output interface 123. The second request signal RQ2 is a signal for requesting a mobile device located in the second wireless communication area A2 to transmit authentication information that is to be used in the second authentication processing. The second request signal RQ2 may be an analog signal or a digital signal.

Accordingly, the output interface 123 is configured as an interface for outputting the second request signal RQ2 to the second communication device 112. In a case where the second request signal RQ2 is an analog signal, the output interface 123 includes an appropriate conversion circuit including a D/A converter.

The first mobile device 41 is configured to transmit the first authentication information AU1 with radio waves also in response to the second request signal RQ2.

The processor 122 is configured to collate the first authentication information AU1 accepted by the reception interface 121 as a response to the second request signal RQ2 with the authentication information of the first mobile device 41 stored in advance in a storage (not illustrated). The processor 122 is configured to determine that the second authentication processing is approved in a case where a matching degree of both information exceeds a threshold value, and to output a second notification signal NT2 from the output interface 123. The second notification signal NT2 is a signal for notifying the mobile device located in the second wireless communication area A2 that the second authentication processing is approved. The second notification signal NT2 may be an analog signal or a digital signal.

Accordingly, the output interface 123 is configured as an interface for outputting the second notification signal NT2 to the second communication device 112. In a case where the second notification signal NT2 is an analog signal, the output interface 123 includes an appropriate conversion circuit including a D/A converter.

The first mobile device 41 is configured to be brought into a state capable of transmitting an activation signal AC for instructing the ignition power source 24 to supply power to the engine in response to receiving of the second notification signal NT2. In response to a prescribed operation performed by the first user 31 with respect to the first mobile device 41, the activation signal AC is transmitted to the second communication device 112 with radio waves. The activation signal AC may be an analog signal or a digital signal.

Accordingly, the reception interface 121 of the control device 12 is configured as an interface capable of accepting the activation signal AC through the second communication device 112. In a case where the activation signal AC is an analog signal, the reception interface 121 includes an appropriate conversion circuit including an A/D converter.

The processor 122 is configured to output a second control signal CT2 from the output interface 123 in response to the acceptance of the activation signal AC by the reception interface 121. The second control signal CT2 is a signal for causing the ignition power source 24 to supply power to the engine. The second control signal CT2 may be an analog signal or a digital signal. In a case where the second control signal CT2 is an analog signal, the output interface 123 includes an appropriate conversion circuit including a D/A converter.

The ignition power source 24 is configured to start supplying power to the engine based on the second control signal CT2.

The second mobile device 42 is configured to transmit the second response signal RS2 with radio waves when the received signal strength of the first trigger signal TR1 transmitted from the first communication device 111 exceeds a threshold value. The second response signal RS2 may be an analog signal or a digital signal.

Accordingly, the reception interface 121 of the control device 12 is configured as an interface capable of accepting the second response signal RS2 through the first communication device 111. In a case where the second response signal RS2 is an analog signal, the reception interface 121 includes an appropriate conversion circuit including an A/D converter.

The processor 122 is configured to, based on the acceptance of the second response signal RS2 by the reception interface 121 in response to the first trigger signal TR1, determine that a communication link is established between the first communication device 111 and the second mobile device 42, and to output a first request signal RQ1 from the output interface 123 to the first communication device 111.

The second mobile device 42 is configured to transmit second authentication information AU2 with radio waves in response to the first request signal RQ1. The second authentication information AU2 is information capable of identifying at least one of the second user 32 and the second mobile device 42. The first authentication information AU1 may be in the form of analog data or digital data.

Accordingly, the reception interface 121 of the control device 12 is configured as an interface capable of accepting the second authentication information AU2 through the first communication device 111. In a case where the second authentication information AU2 is in the form of analog data, the reception interface 121 includes an appropriate conversion circuit including an A/D converter.

The processor 122 is configured to collate the second authentication information AU2 accepted by the reception interface 121 as a response to the first request signal RQ1 with the authentication information of the second mobile device 42 stored in advance in a storage (not illustrated). The processor 122 is configured to determine that the first authentication processing is approved in a case where a matching degree of both information exceeds a threshold value, and to output a first notification signal NT1 from the output interface 123 to the first communication device 111.

The second mobile device 42 is configured to be brought into a state capable of transmitting a locking/unlocking signal LK for instructing the locking/unlocking device 23 to perform a locking/unlocking operation in response to receiving of the first notification signal NT1. In response to a prescribed operation performed by the second user 32 with respect to the second mobile device 42, the locking/unlocking signal LK is transmitted to the first communication device 111 with radio waves. Since the operation of the control device 12 having accepted the locking/unlocking signal LK is as described above, repetitive descriptions for those will be omitted.

Figure 3:
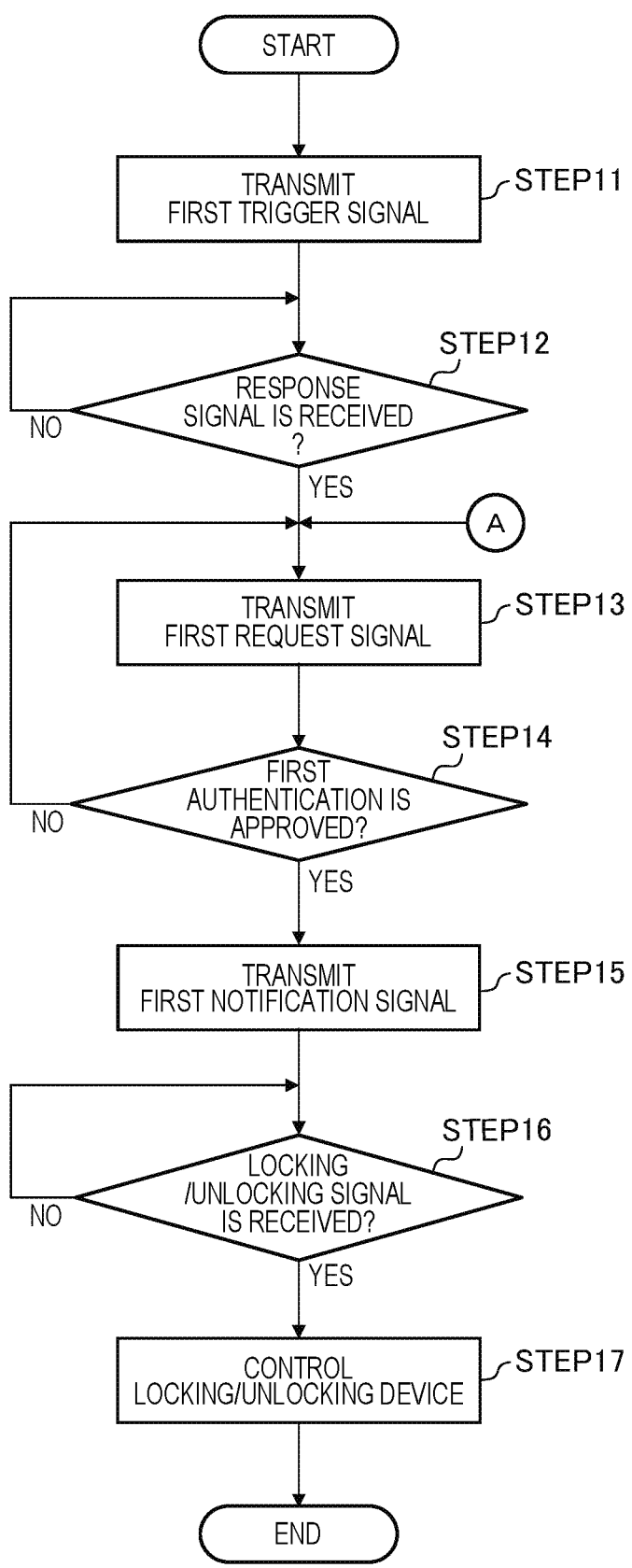
FIG. 3 illustrates a flow of first authentication to be executed by a control device of FIG. 1.
Figure 4:
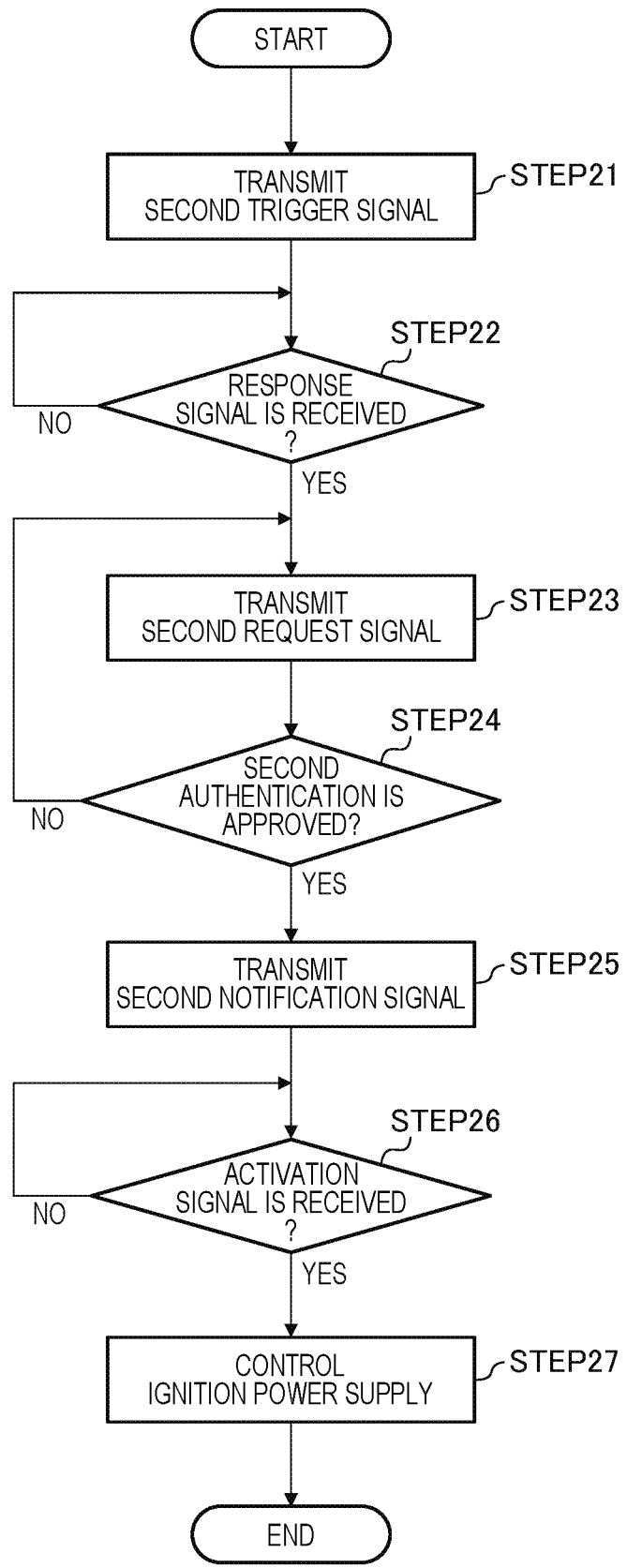
FIG. 4 illustrates a flow of second authentication to be executed by the control device of FIG. 1.

Referring to FIGS. 3 and 4, the operations of the authentication system 10 configured as described above will be described. FIG. 3 illustrates a flow of a first authentication processing to be executed by the processor 122 of the control device 12. FIG. 4 illustrates a flow of a second authentication processing to be executed by the processor 122. Here, as illustrated in FIG. 1, a case where the first user 31 carrying the first mobile device 41 first gets into the vehicle 20 will be described as an example.

As illustrated in FIG. 3, the processor 122 of the control device 12 causes the first communication device 111 to transmit the first trigger signal TR1 (STEP11).

Subsequently, the processor 122 determines whether a response signal is received from any of the mobile devices in response to the first trigger signal TR1 (STEP12). Specifically, it is determined whether the response signal is accepted by the reception interface 121 through the first communication device 111. The processing is repeated until it is determined that the response signal is accepted by the reception interface 121 (NO in STEP12).

In the example illustrated in FIG. 1, since the first user 31 carrying the first mobile device 41 enters the first wireless communication area A1, the first response signal RS1 is transmitted from the first mobile device 41.

In a case where it is determined that the response signal is accepted by the reception interface 121 (YES in STEP12 in FIG. 3), the processor 122 transmits the first request signal RQ1 with radio waves through the first communication device 111 (STEP13). In this example, the first request signal RQ1 is transmitted to the first mobile device 41.

Next, the processor 122 determines whether the first authentication processing is approved based on the authentication information accepted by the reception interface 121 in response to the first request signal RQ1 (STEP14). In this example, since the first authentication information AU1 is received from the first mobile device 41 in response to the first request signal RQ1, it is determined whether the authentication of the first mobile device 41 based on the first authentication information AU1 is approved.

In a case where the first authentication processing is not approved (NO in STEP14), the processing is returned to STEP13, and the first request signal RQ1 is retransmitted. In a case where the first authentication processing is not approved even if it is repeated prescribed number of times, the processor 122 may transmit a notification signal indicating that the authentication is not approved from the first communication device 111 to the first mobile device 41.

In a case where the first authentication processing is approved (YES in STEP14), the processor 122 causes the first communication device 111 to transmit the first notification signal NT1 (STEP15). In this example, the first notification signal NT1 is transmitted to the first mobile device 41.

Subsequently, the processor 122 determines whether the locking/unlocking signal LK is accepted by the reception interface 121 (STEP16). The processing is repeated until it is determined that the locking/unlocking signal LK is accepted by the reception interface 121 (NO in STEP16). In a case where it is determined that the locking/unlocking signal LK is not accepted even after a prescribed time length elapses from the transmission of the first notification signal NT1, the processor 122 may return the processing to STEP15 and retransmit the first notification signal NT1.

In a case where it is determined that the locking/unlocking signal LK is accepted by the reception interface 121 (YES in STEP16), the processor 122 outputs the first control signal CT1 corresponding to the locking/unlocking signal LK from the output interface 123, and performs the operation control of the locking/unlocking device 23 (STEP17).

As illustrated in FIG. 1, the first user 31 carrying the first mobile device 41 may enter the cabin 21 through the unlocked door 22. In this case, the first mobile device 41 is located in the second wireless communication area A2.

As illustrated in FIG. 4, the processor 122 of the control device 12 causes the second communication device 112 to transmit the second trigger signal TR2 (STEP21). This processing may be performed in parallel with the transmission of the first trigger signal TR1 from the first communication device 111, or may be initiated after the completion of the operation control of the locking/unlocking device 23 based on the first authentication processing.

Subsequently, the processor 122 determines whether a response signal is received from any of the mobile devices in response to the second trigger signal TR2 (STEP22). Specifically, it is determined whether the response signal is accepted by the reception interface 121 through the second communication device 112. The processing is repeated until it is determined that the response signal is accepted by the reception interface 121 (NO in STEP22).

In the example illustrated in FIG. 1, since the first mobile device 41 is located in the second wireless communication area A2, the first response signal RS1 is transmitted from the first mobile device 41.

In a case where it is determined that the response signal is accepted by the reception interface 121 (YES in STEP22 in FIG. 4), the processor 122 transmits the second request signal RQ2 with radio waves through the second communication device 112 (STEP23). In this example, the second request signal RQ2 is transmitted to the first mobile device 41.

Next, the processor 122 determines whether the second authentication processing is approved based on the authentication information accepted by the reception interface 121 in response to the second request signal RQ2 (STEP24). In this example, since the first authentication information AU1 is received from the first mobile device 41 in response to the second request signal RQ2, it is determined whether the authentication of the first mobile device 41 based on the first authentication information AU1 is approved.

In a case where the second authentication processing is not approved (NO in STEP24), the processing is returned to STEP23, and the second request signal RQ2 is retransmitted. In a case where the second authentication processing is not approved even if it is repeated prescribed number of times, the processor 122 may transmit a notification signal indicating that the authentication is not approved from the second communication device 112 to the first mobile device 41.

In a case where the second authentication processing is approved (YES in STEP24), the processor 122 causes the second communication device 112 to transmit the second notification signal NT2 (STEP25). In this example, the second notification signal NT2 is transmitted to the first mobile device 41.

Subsequently, the processor 122 determines whether the activation signal AC is accepted by the reception interface 121 (STEP26). The processing is repeated until it is determined that the activation signal AC is accepted by the reception interface 121 (NO in STEP26). In a case where the acceptance of the activation signal AC cannot be confirmed even after a prescribed time length elapses from the transmission of the second notification signal NT2, the processor 122 may return the processing to STEP25 and retransmit the second notification signal NT2.

In a case where it is determined that the activation signal AC is accepted by the reception interface 121 (YES in STEP26), the processor 122 outputs the second control signal CT2 from the output interface 123, and performs the operation control of the ignition power supply 24 (STEP27).

The control device 12 is configured to use the first communication device 111 to communicate with another mobile device after the operation of the locking/unlocking device 23 based on the authentication processing of one mobile device is controlled.

Figure 5:
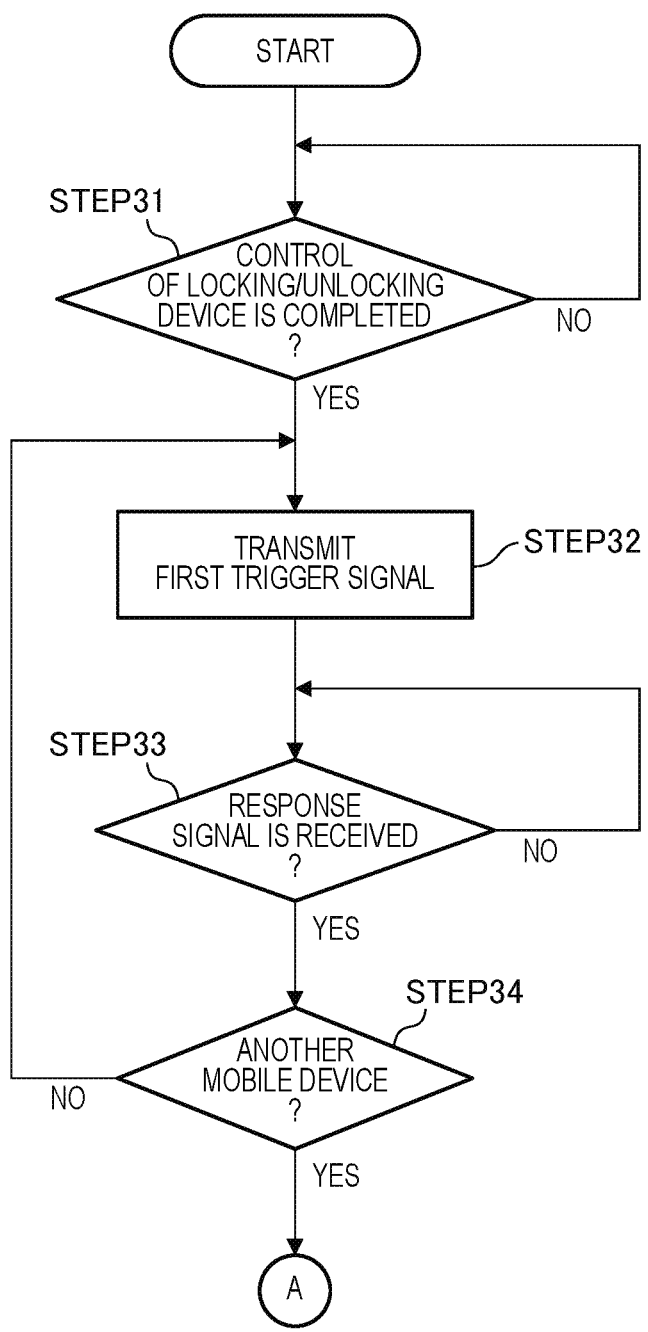
FIG. 5 illustrates an exemplary flow of processing to be executed by the control device of FIG. 1.

Specifically, as illustrated in FIG. 5, the processor 122 of the control device 12 determines whether the operation control of the locking/unlocking device 23 is completed (STEP31). The determination that the operation control is completed may be made based on the fact that the first control signal CT1 for performing the operation control of the locking/unlocking device 23. In a case where the reception interface 121 is configured to accept a completion signal indicating that the operation control is completed from the locking/unlocking device 23, the determination that the operation control is completed may be made based on the fact that the completion signal is accepted. The processing is repeated until it is determined that the operation control of the locking/unlocking device 23 is completed (NO in STEP31).

In a case where it is determined that the operation control of the locking/unlocking device 23 is completed (YES in STEP31), the processor 122 causes the first communication device 111 to transmit the first trigger signal TR1 (STEP32).

Subsequently, the processor 122 determines whether a response signal is received from any of the mobile devices in response to the first trigger signal TR1 (STEP33). Specifically, it is determined whether the response signal is accepted by the reception interface 121 through the first communication device 111. The processing is repeated until it is determined that the response signal is accepted by the reception interface 121 (NO in STEP33).

In a case where it is determined that the response signal is accepted by the reception interface 121 (YES in STEP33), the processor 122 determines whether the response signal is transmitted from a mobile device different from the mobile device used for the operation control of the locking/unlocking device 23 (STEP34).

In the case illustrated in FIG. 1, there is a possibility that the first response signal RS1 from the first mobile device 41 located in the cabin 21 and the second response signal RS2 from the second mobile device 42 located outside the cabin 21 are accepted.

In a case where the response signal accepted by the reception interface 121 is transmitted from the same mobile device as the one used for the operation control of the locking/unlocking device 23 (NO in STEP34 in FIG. 5), the processor 122 returns the processing to STEP32, and continues the transmission of the first trigger signal TR1. That is, a response from the mobile device used for controlling the operation of the locking/unlocking device 23 is ignored. In this example, the first response signal RS1 from the first mobile device 41 is ignored.

In a case where the response signal accepted by the reception interface 121 is transmitted from a mobile device different from the one used for controlling the operation of the locking/unlocking device 23 (YES in STEP34), the processor 122 starts processing for authenticating the mobile device. Specifically, the processor 122 causes the first communication device 111 to transmit the first request signal RQ1 to the other mobile device (STEP13 in FIG. 3).

When the second mobile device 42 carried by the second user 32 illustrated in FIG. 1 enters the first wireless communication area A1, the reception interface 121 of the control device 12 accepts the second response signal RS2 in response to the first trigger signal TR1. Accordingly, the processor 122 starts the processing for authenticating the second mobile device 42. In a case where the first authentication processing is approved for the second mobile device 42, in response to a prescribed operation performed by the second user 32 with respect to the second mobile device 42, the operation control of the locking/unlocking device 23 is allowed.

According to the configuration as described above, even after the operation control of the locking/unlocking device 23 is performed based on the authentication of a certain mobile device and while the operation control of the ignition power source 24 is performed based on the authentication of the same mobile device, the establishment of communication with another mobile device is allowed, so that the use of the locking/unlocking device 23 by another mobile device is not restricted. Accordingly, it is possible to improve the convenience of the authentication system 10 shared by a plurality of mobile devices.

Figure 6:
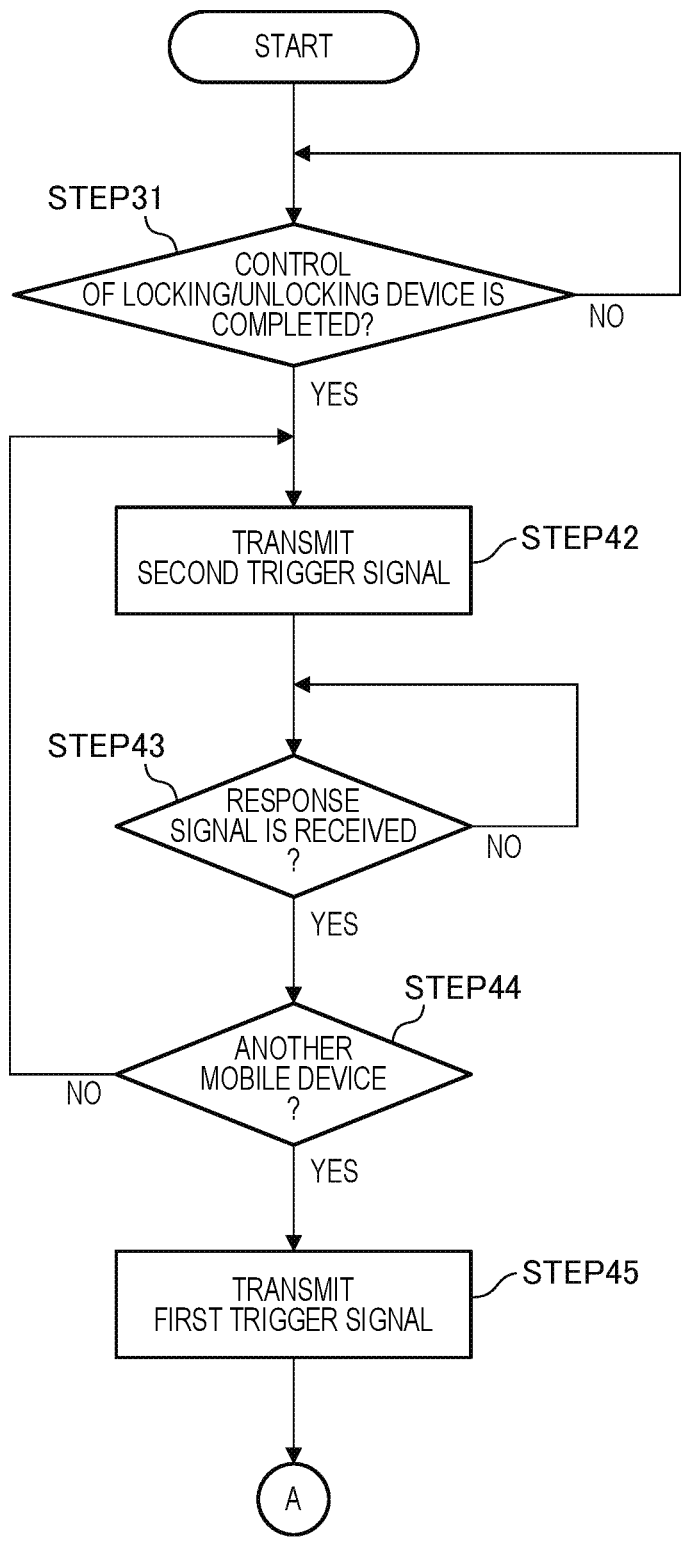
FIG. 6 illustrates another exemplary flow of processing to be executed by the control device of FIG. 1.

FIG. 6 illustrates another exemplary flow of processing to be executed by the processor 122 of the control device 12. Processing elements substantially the same as those illustrated in FIG. 5 are assigned with the same reference numerals, and repetitive descriptions for those will be omitted.

In a case where it is determined that the operation control of the locking/unlocking device 23 is completed (YES in STEP31), the processor 122 causes the second communication device 112 to transmit the second trigger signal TR2 (STEP42). At this time, a transmission signal strength of the second trigger signal TR2 may be increased so as to enlarge the second wireless communication area A2.

Subsequently, the processor 122 determines whether a response signal is received from any of the mobile devices in response to the second trigger signal TR2 (STEP43). Specifically, it is determined whether the response signal is accepted by the reception interface 121 through the second communication device 112. The processing is repeated until it is determined that the response signal is accepted by the reception interface 121 (NO in STEP43).

In a case where it is determined that the response signal is accepted by the reception interface 121 (YES in STEP43), the processor 122 determines whether the response signal is transmitted from a mobile device different from the mobile device used for the operation control of the locking/unlocking device 23 (STEP44).

In the case illustrated in FIG. 1, there is a possibility that the first response signal RS1 from the first mobile device 41 located in the cabin 21 and the second response signal RS2 from the second mobile device 42 located outside the cabin 21 are accepted.

In a case where the response signal accepted by the reception interface 121 is transmitted from the same mobile device as the one used for the operation control of the locking/unlocking device 23 (NO in STEP44 in FIG. 6), the processor 122 returns the processing to STEP42, and continues the transmission of the second trigger signal TR2. That is, a response from the mobile device used for controlling the operation of the locking/unlocking device 23 is ignored. In this example, the first response signal RS1 from the first mobile device 41 is ignored.

In a case where the response signal accepted by the reception interface 121 is transmitted from a mobile device different from the one used for the operation control of the locking/unlocking device 23 (YES in STEP44), the processor 122 causes the first communication device 111 to transmit the first trigger signal TR1 (STEP45), and starts the processing for authenticating the mobile device. Specifically, the processor 122 causes the first communication device 111 to transmit the first request signal RQ1 to the other mobile device (STEP13 in FIG. 3).

When the second mobile device 42 carried by the second user 32 illustrated in FIG. 1 enters the second wireless communication area A2 located outside the cabin 21, the reception interface 121 of the control device 12 accepts the second response signal RS2 in response to the second trigger signal TR2. Accordingly, the processor 122 starts the processing for authenticating the second mobile device 42. In a case where the first authentication processing is approved for the second mobile device 42, in response to a prescribed operation performed by the second user 32 with respect to the second mobile device 42, the operation control of the locking/unlocking device 23 is allowed.

In other words, when a mobile device different from the mobile device used for controlling the operation of the locking/unlocking device 23 is detected outside the cabin 21, the control device 12 according to the present example starts using the first communication device 111 in order to communicate with the other mobile device.

According to such a configuration, even while the operation of the ignition power source 24 is controlled by the mobile device used for controlling the operation of the locking/unlocking device 23, the establishment of communication with another mobile device can be allowed. In addition, since the operation of the first communication device 111 can be stopped until another mobile device is detected outside the cabin 21, it is possible to improve the utilization efficiency of the radio waves.

The processor 122 of the control device 12 having various functions described above can be implemented by a general-purpose microprocessor operating in cooperation with a general-purpose memory. Examples of the general-purpose microprocessor include a CPU, an MPU, and a GPU. Examples of the general-purpose memory include a ROM and a RAM. In this case, a computer program for executing the above-described processing can be stored in the ROM. The ROM is an example of a non-transitory computer-readable medium having stored a computer program. The general-purpose microprocessor designates at least a part of the computer program stored in the ROM, loads the program on the RAM, and executes the processing described above in cooperation with the RAM. The above-described computer program may be pre-installed in a general-purpose memory, or may be downloaded from an external server device (not illustrated) via a wireless communication network (not illustrated) and then installed in the general-purpose memory. In this case, the external server device is an example of a non-transitory computer-readable medium having stored a computer program.

The processor 122 may be implemented by an exclusive integrated circuit capable of executing the above-described computer program, such as a microcontroller, an ASIC, and an FPGA. In this case, the above-described computer program is pre-installed in a memory element included in the exclusive integrated circuit. The memory element is an example of a non-transitory computer-readable medium having stored a computer program. The processor 122 may also be implemented by a combination of a general-purpose microprocessor and an exclusive integrated circuit.

The above embodiments are merely illustrative for facilitating understanding of the gist of the presently disclosed subject matter. The configuration according to each of the above embodiments can be appropriately modified or changed without departing from the gist of the presently disclosed subject matter.

In FIG. 1, the first communication device 111, the second communication device 112, and the control device 12 are illustrated as a plurality of devices independently installed at different positions in the vehicle 20. However, at least one of the first communication device 111 and the second communication device 112 may be provided as a part of the control device 12.

At least a part of the first authentication processing and at least a part of the second authentication processing performed by the processor 122 of the control device 12 may be performed in an external server device (not illustrated) capable of communicating with the first mobile device 41 and the second mobile device 42 via a wireless communication network (not illustrated).

The device to be controlled by the control device 12 as a result of the authentication processing is not limited to the locking/unlocking device 23 and the ignition power source 24. Examples of another device to be controlled include an engine, an air conditioner, an audio-visual device, a lighting device, and a position adjustment mechanism for a seat or a steering wheel, each of which are installed in the vehicle 20.

The authentication system 10 may be installed in a mobile entity other than the vehicle 20. Examples of another mobile entity include railways, aircraft, and ships. Such mobile entities may not require a driver.

The reclosable body to be locked/unlocked by the locking/unlocking device 23 is not limited to the door of the mobile entity. Doors and windows in homes and facilities may also be an example of the reclosable body. In addition, various equipment in a house or a facility may also be an example of the device to be controlled. In other words, the first communication device 111, the second communication device 112, and the control device 12 need not to be installed in a mobile entity. An appropriate area in a house or facility may be an example of the prescribed area.

The invention claimed is:

1. An authentication system, comprising:
 a first communication device configured to form a first wireless communication area at least outside a prescribed area;
 a second communication device configured to form a second wireless communication area at least inside the prescribed area; and
 a control device configured to:
  perform an operation control of a first device to be controlled, based on first authentication processing for authenticating a first mobile device located in the first wireless communication area;
  perform an operation control of a second device to be controlled that is different from the first device to be controlled, based on second authentication processing for authenticating the first mobile device located in the second wireless communication area; and
  perform an operation control of the first communication device to perform communication with a second mobile device that is different from the first mobile device after the operation control of the first device to be controlled is performed.

2. The authentication system according to claim 1, wherein the control device is configured to start using the first communication device to perform communication with the second mobile device in response to detection performed by the second communication device that the second mobile device is located outside the prescribed area.

3. The authentication system according to claim 1, wherein the first device to be controlled is a locking/unlocking device configured to lock/unlock a reclosable body that opens/closes the prescribed area.

4. The authentication system according to claim 1, wherein the first communication device, the second communication device, and the control device are installed in a mobile entity.

5. A control device, comprising:
 an interface configured to:
  accept authentication information, by way of a first communication device that forms a first wireless communication area at least outside a prescribed area, from a first mobile device that is located in the first wireless communication area; and
  accept the authentication information, by way of a second communication device that forms a second wireless communication area at least inside the prescribed area, from the first mobile device that is located in the second wireless communication area; and
 a processor configured to:
  perform an operation control of a first device to be controlled, based on first authentication processing for authenticating the first mobile device with the authentication information accepted by way of the first communication device;
  perform an operation control of a second device to be controlled that is different from the first device to be controlled, based on second authentication processing for authenticating the first mobile device with the authentication information accepted by way of the second communication device; and
  perform an operation control of the first communication device to perform communication with a second mobile device that is different from the first mobile device after the operation control of the first device to be controlled is performed.

6. A non-transitory computer-readable medium having stored a computer program adapted to be executed by a processor installed in a control device, the computer program being configured to cause, when executed, the control device to:
 accept authentication information, by way of a first communication device that forms a first wireless communication area at least outside a prescribed area, from a first mobile device that is located in the first wireless communication area;
 perform an operation control of a first device to be controlled, based on first authentication processing for authenticating the first mobile device with the authentication information accepted by way of the first communication device;
 accept the authentication information, by way of a second communication device that forms a second wireless communication area at least inside the prescribed area, from the first mobile device that is located in the second wireless communication area;
 perform an operation control of a second device to be controlled that is different from the first device to be controlled, based on second authentication processing for authenticating the first mobile device with the authentication information accepted by way of the second communication device; and perform an operation control of the first communication device to perform communication with a second mobile device that is different from the first mobile device after the operation control of the first device to be controlled is performed.

\* \* \* \* \*